(12) United States Patent
Goldstein

(10) Patent No.: US 12,055,461 B2
(45) Date of Patent: Aug. 6, 2024

(54) SINGLE-LAYER MEMBRANE ASSEMBLIES FOR SEALING FAULT DETECTION AND LOCATION, AND RELATED METHODS

(71) Applicant: HUMIGAL LTD., Jerusalem (IL)

(72) Inventor: Pinchas Goldstein, Jerusalem (IL)

(73) Assignee: HUMIGAL LTD, Jerusalem (IL)

( * ) Notice: Subject to any disclaimer, the term of this patent is extended or adjusted under 35 U.S.C. 154(b) by 63 days.

(21) Appl. No.: 17/766,262

(22) PCT Filed: Oct. 1, 2020

(86) PCT No.: PCT/IB2020/059217
§ 371 (c)(1),
(2) Date: Apr. 4, 2022

(87) PCT Pub. No.: WO2021/070020
PCT Pub. Date: Apr. 15, 2021

(65) Prior Publication Data
US 2023/0027054 A1 Jan. 26, 2023

(30) Foreign Application Priority Data
Oct. 7, 2019 (GB) .................................... 1914484

(51) Int. Cl.
*G01M 3/16* (2006.01)
*E04B 1/66* (2006.01)
(Continued)

(52) U.S. Cl.
CPC ............... *G01M 3/16* (2013.01); *E04B 1/665* (2013.01); *E04D 13/006* (2013.01); *G01M 3/40* (2013.01)

(58) Field of Classification Search
CPC ........... G01M 3/16; G01M 3/40; E04B 1/665; E04D 13/006
See application file for complete search history.

(56) References Cited

U.S. PATENT DOCUMENTS 7,872,479 B2 1/2011 Lorenz
8,319,508 B2 11/2012 Vokey
(Continued)

FOREIGN PATENT DOCUMENTS

DE 4024049 A1 2/1992
DE 102017116808 A1 5/2018
(Continued)

OTHER PUBLICATIONS

International Search Report PCT/IB2019/061362 mailed Feb. 27, 2020.
(Continued)

*Primary Examiner* — Andrew W Bee
(74) *Attorney, Agent, or Firm* — Momentum IP; Marc Van Dyke

(57) ABSTRACT

A water-impermeable membrane assembly for sealing a surface of a substrate comprises a waterproofing sheet and a plurality of conduits having openings in at least a first major surface, and a leak-alarm circuit disposed at least partly within said equipment space, the leak alarm circuit having a leak-alarm target operative to trigger activation of the leak-alarm circuit when in contact with a water-containing liquid. The leak-alarm circuit comprises an electronic circuit comprising a transmitter and a battery for transmission of a signal. The assembly also includes a capillary pathway disposed within at least a portion of the conduits, including at least one conduit in fluid communication with the equipment space and with respective openings disposed in at least said first surface, so as to provide a pathway for transport of a water-containing liquid by capillary action from said openings to said leak-alarm target.

15 Claims, 9 Drawing Sheets

(51) Int. Cl.
*E04D 13/00* (2006.01)
*G01M 3/40* (2006.01)

(56) References Cited

U.S. PATENT DOCUMENTS

| | | | |
|---|---|---|---|
| 8,384,886 | B2 | 2/2013 | Richardson |
| 10,121,353 | B1 | 11/2018 | Billman |
| 10,344,470 | B2 | 7/2019 | Golding |
| 2008/0143349 | A1 | 6/2008 | Lorenz |
| 2010/0141283 | A1* | 6/2010 | Vokey .................... G01M 3/16 324/705 |
| 2011/0194102 | A1* | 8/2011 | Richardson ........... G01M 3/047 356/73.1 |
| 2015/0102932 | A1 | 4/2015 | Miller |
| 2015/0259923 | A1 | 9/2015 | Sleeman |
| 2018/0010329 | A1* | 1/2018 | Golding, Jr. ............. B32B 5/26 |
| 2021/0317665 | A1* | 10/2021 | Hilleringmann .......... B32B 3/08 |
| 2022/0090978 | A1 | 3/2022 | Goldstein |
| 2023/0027054 | A1 | 1/2023 | Goldstein |

FOREIGN PATENT DOCUMENTS

| | | | |
|---|---|---|---|
| WO | 2016/153337 | A1 | 9/2016 |
| WO | WO-2016153337 | A1 * | 9/2016 ........... E04D 13/006 |
| WO | 2020/136596 | A1 | 7/2020 |
| WO | 2021/070020 | A1 | 4/2021 |

OTHER PUBLICATIONS

International Search Report PCT/IB2020/059217 mailed Dec. 24, 2020.
Written Opinion of PCT/IB2019/061362 mailed Feb. 27, 2020.
Written Opinion of PCT/IB2020/059217 mailed Dec. 24, 2020.

* cited by examiner

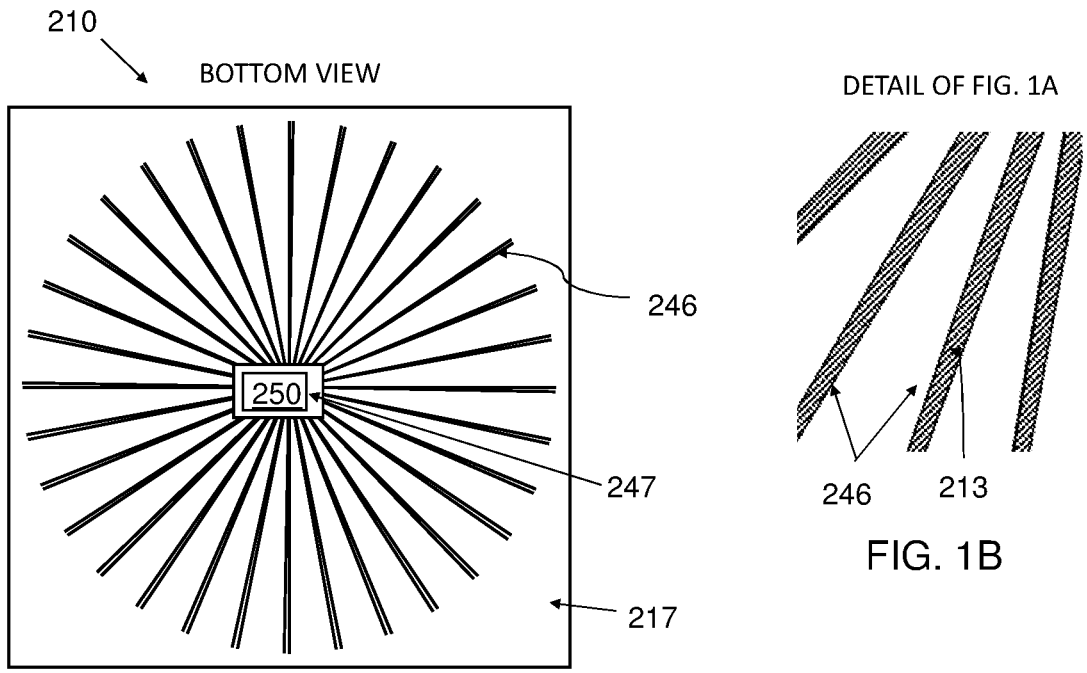
FIG. 1A
FIG. 1B
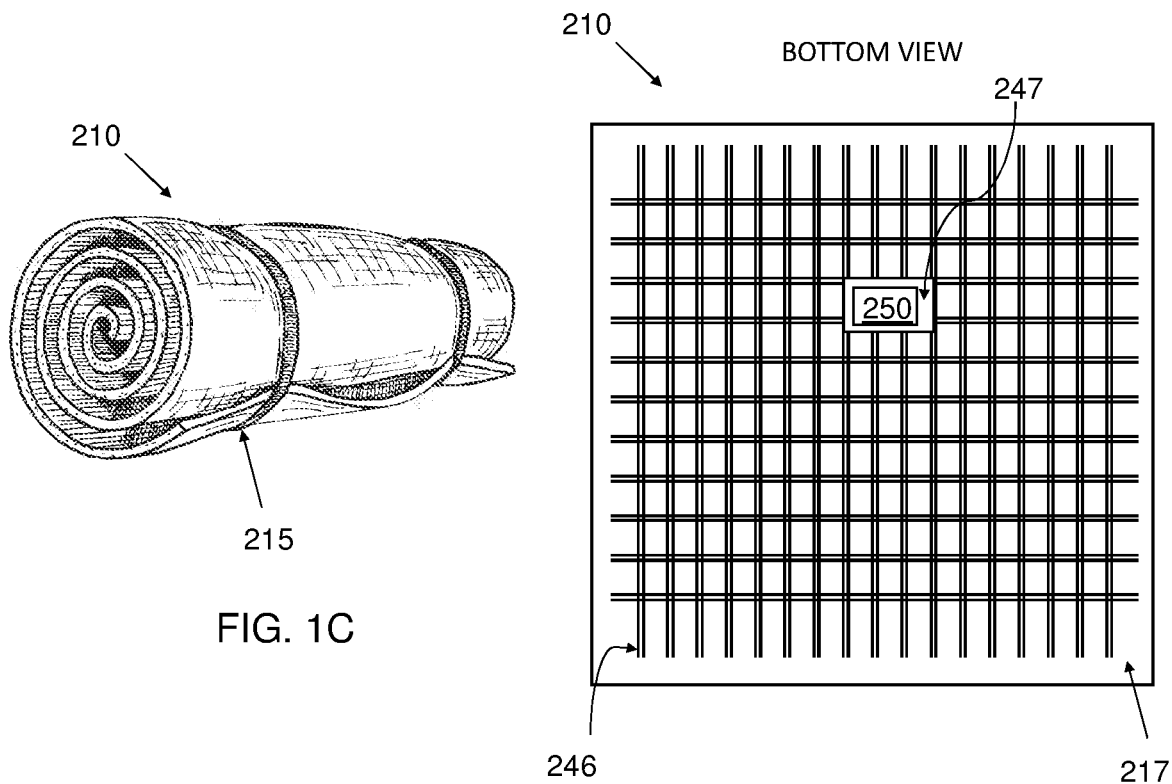
FIG. 1C
FIG. 2

SINGLE-LAYER MEMBRANE ASSEMBLIES FOR SEALING FAULT DETECTION AND LOCATION, AND RELATED METHODS

FIELD OF THE INVENTION

The present invention relates to membrane assemblies for sealing structural substrates against the entrance of water, including membrane assemblies comprising integral water detection elements, and related components and methods for their manufacture and use in detecting and locating sealing faults within and around the membrane assemblies.

BACKGROUND

The use of water-impenetrable membranes as sealing sheets for rooves and other structural substrates is well known in the industry. Such sealing sheets can include, for example, bitumen, polymers or other hydrophilic materials such as silicon-based materials.

Timely detection of manufacturing and installation defects in the sealing sheets, or of faults after extended time in situ, can save substantial costs of remediating water damage to structures and contents. The use of battery-powered and mains-powered circuits to detect water under sealing sheets is known in the industry, but such use depends upon depending on the water pooling at or near the detector before it has a chance to enter the substrate and begin to do damage. The inventor has discerned, however, that such detection circuits do not allow for simple and effective non-destructive testing to ensure the working status of components, or for quick identification and location of potential leaks. The inventor has further discerned that the products known in the industry require a more sophisticated and complex installation procedure and, in some cases, the hiring of different categories of workers other than semi-skilled sealing-sheet installers. Therefore, there is a need for water-impenetrable membranes with integral or built-in water detection capabilities, which afford simple installation and in-situ monitoring during their lifetimes.

SUMMARY

Embodiments relate to water-impermeable membrane assemblies that include water-detection or leak-detection circuits and components, and methods for their manufacture and use.

According to embodiments, a water-impermeable membrane assembly for sealing a surface of a substrate comprises: (a) a waterproofing sheet having two opposing major surfaces and comprising (i) an equipment space and (ii) a plurality of conduits having openings disposed in at least a first surface of said major surfaces; and (b) a leak-alarm circuit disposed at least partly within said equipment space, the leak alarm circuit having a leak-alarm target operative to trigger activation of the leak-alarm circuit when in contact with a water-containing liquid, the leak-alarm circuit comprising: (i) an electronic circuit comprising a transmitter, the electronic circuit being operative, when in an activated state triggered by said leak-alarm target, to transmit a signal; and (ii) a battery connected to the electronic circuit for powering transmission of said signal. The membrane assembly additionally comprises a capillary pathway disposed within at least a portion of the conduits, said portion including at least one conduit in fluid communication with the equipment space and with respective openings disposed in at least said first surface, so as to provide a pathway for transport of a water-containing liquid by capillary action from said openings to said leak-alarm target.

In some embodiments, the membrane assembly can be rolled up for storage and/or installation. In some embodiments, the membrane assembly can be provided in a rolled-up format. In some embodiments, the membrane assembly can be provided in a continuous strip of membrane assemblies.

In some embodiments, at least some of the conduits can comprise cutouts in the waterproofing sheet. In some embodiments, the equipment space can comprise a cutout in the waterproofing sheet.

In some embodiments, the membrane assembly can additionally comprise a shielding material covering at least one cutout, the shielding material being disposed on or adjacent to at least one of said major surfaces and configured to provide protection for the contents of said at least one cutout.

In some embodiments, at least some of the conduits can comprise grooves open solely on one major surface of the waterproofing sheet. In some embodiments, said equipment space can comprise an equipment recess open solely on one major surface of the waterproofing sheet.

In some embodiments, it can be that in an operative mode, with the waterproofing sheet laid out on the surface of the substrate, said one major surface faces the substrate. In some embodiments, it can be that in an operative mode, with the waterproofing sheet laid out on the surface of the substrate, a water-containing liquid disposed between the surface and the membrane assembly is drawn up through said capillary pathway.

In some embodiments, a portion of said capillary pathway can be disposed at an inlet of said equipment space so as to provide a pathway for ingress of the water-containing liquid into said equipment space.

In some embodiments, it can be that (i) the leak-alarm target includes the battery, and (ii) the battery comprises two electrodes which in combination are electrochemically activatable by the presence of an aqueous liquid. In some such embodiments, the membrane assembly can additionally comprise a quantity of salt effective to facilitate a current-generating reaction between the two electrodes when the salt is dissolved in said aqueous liquid, wherein said quantity of salt can be disposed in at least one of said equipment space and a conduit of the plurality of conduits.

In some embodiments, the capillary pathway can comprise a plurality of fibers selected from the group consisting of at least one of plant-based fibers, polymer-based fibers, glass fibers and carbon fibers. In some such embodiments, the capillary pathway can comprise bundled glass fibers. In some such embodiments, the capillary pathway can comprise broken glass fibers.

In some embodiments, it can be that with the membrane footprint-area virtually divided into 100 equal-area subdivisions, a continuous capillary pathway exists from at least 50%, and optionally at least 70%, and optionally at least 90%, of said equal-area subdivisions to said leak-alarm target.

In some embodiments, the transmitted signal can include information about the identity and/or location of the membrane assembly.

In some embodiments, the leak-alarm circuit can be configured to transmit information related to at least one of: its status, the identity of the membrane assembly and the location of the membrane assembly in response to being polled. In some embodiments, the leak-alarm circuit can be configured to transmit information related to at least one of:

its status, the identity of the membrane assembly and the location of the membrane assembly to a smart-home or intelligent-building control system.

In some embodiments, the membrane area can be at least 0.6 square meters, and optionally at least 0.8 square meters. In some embodiments, said footprint-area ratio of said leak-alarm target footprint to said membrane area can be less than 0.15, and optionally less than 0.05, and optionally less than 0.01. In some embodiments, the thickness of the membrane can be reduced in the depressions by at least 10% and not more than 60%, and optionally by at least 20% and not more than 50%.

In some embodiments, the electronic circuit can additionally comprise a charge pump.

In some embodiments, the membrane assembly can additionally comprise a heat-resistant film that is stable in elevated temperatures of up to at least 200° C., disposed so as to protect the leak-alarm circuit from the elevated temperatures.

In some embodiments, the waterproofing sheet can comprise a bituminous sheet.

In some embodiments, a super-assembly can comprise a plurality of water-impermeable membrane assemblies, the assemblies being arranged in a continuous strip.

A method is disclosed, according to embodiments, of sealing a substrate, i.e., sealing a surface of a substrate, with a plurality of leak-detecting membrane assemblies. The method comprises: (a) providing a plurality of water-impermeable membrane assemblies, each membrane assembly comprising: (i) a waterproofing sheet having two opposing major surfaces and comprising (A) an equipment space and (B) a plurality of conduits having openings disposed in at least a first surface of said major surfaces; (ii) a leak-alarm circuit disposed at least partly within said equipment space, the leak alarm circuit having a leak-alarm target operative to trigger activation of the leak-alarm circuit when in contact with a water-containing liquid, the leak-alarm circuit comprising: (A) an electronic circuit comprising a transmitter, the electronic circuit being operative, when in an activated state triggered by said leak-alarm target, to transmit a signal; and a battery connected to the electronic circuit for powering transmission of said signal; and (iii) a capillary pathway disposed within at least a portion of the conduits, said portion including at least one conduit in fluid communication with the equipment space and with respective ones of said openings disposed in at least said first surface, so as to provide a pathway for transport of a water-containing liquid by capillary action from said openings to said leak-alarm target. The method additionally comprises: (b) bonding, to the substrate, said plurality of water-impermeable membrane assemblies.

In some embodiments, the plurality of water-impermeable membrane assemblies can be provided as a continuous strip. In some embodiments, the plurality of water-impermeable membranes can be provided in a rolled-up continuous strip. In some embodiments, the method can additionally comprise, before the bonding: unrolling the rolled-up continuous strip on the substrate.

In some embodiments, at least some of the conduits can comprise grooves open solely on one major surface of the waterproofing sheet. In some embodiments, said equipment space can comprise an equipment recess open solely on one major surface of the waterproofing sheet. In some embodiments, it can be that the bonding is such that one major surface faces the substrate. In some embodiments, the method can additionally comprise, after said bonding, polling said leak-alarm circuit and, in response to said polling, receiving information transmitted by said leak-alarm circuit, the information being related to a status of said leak-alarm circuit.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIG. 1A is a schematic bottom view of a water-impermeable membrane assembly comprising a leak-alarm circuit and a capillary pathway according to embodiments of the present invention.

FIG. 1B shows a detail of FIG. 1A according to embodiments of the present invention.

FIG. 1C is a schematic perspective view of a membrane assembly provided in a rolled-up format.

FIG. 2 is a schematic bottom view of a water-impermeable membrane assembly comprising a leak-alarm circuit and a capillary pathway according to embodiments of the present invention.

DETAILED DESCRIPTION OF THE ILLUSTRATED EMBODIMENTS

Figure 3A:
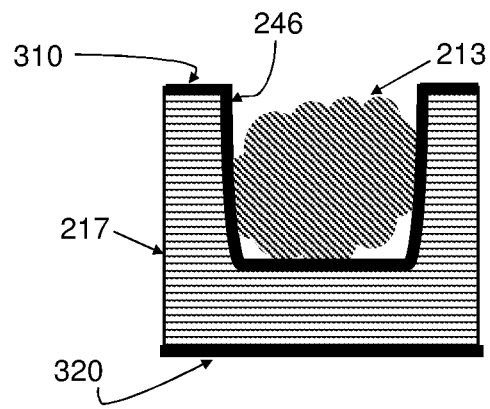
FIGS. 3A and 3B are schematic cross-sectional views of capillary pathway conduits that are, respectively, a groove open solely on one major surface of a waterproofing sheet, and a cutout in the waterproofing sheet, according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

According to embodiments, a water-impermeable membrane assembly includes a water-impermeable membrane, e.g., a waterproofing sheet. An example of a waterproofing sheet is a bituminous sheet. The membrane assembly can be produced in a continuous strip of membrane assemblies for easier and more efficient installation on a substrate such as, for example, a roof, a floor or a wall. Apparatus for detecting a leak, i.e., the presence of water or the presence of a water-containing liquid, can be included in a space provided within the membrane. The apparatus can include a leak-alarm circuit having a leak-alarm target, along with a material, generally fiber-containing, deployed so as to facilitate transport of the water-containing liquid to the leak-alarm target. The transport can be by capillary action. A "leak-alarm circuit" is an assembly of a battery and electronic components; when the leak-alarm circuit is activated in the presence of water, a signal is transmitted. Such a signal can include information, can include an alarm, or can simply be interpreted as an alarm by the mere fact that it has been transmitted. A "leak-alarm target" is that part of the leak-alarm circuit to which water has to be transported in order to trigger the activation of the leak-alarm circuit.

Referring now to the figures, FIG. 1A shows a non-limiting example of a membrane assembly 210, and a detail section of the membrane assembly 210 is shown in FIG. 1B.

Membranes 217 can include water-impermeable sheets of any size or thickness, fabricated from any water-impermeable material of suitable durability and cost. In some embodiments, membranes can comprise bitumen. In other embodiments, membranes can comprise a polymer such as PVC polyvinyl chloride. In yet other embodiments, membranes can comprise a silicon-based material. The size of the membranes can be selected in accordance with the specifications of manufacturing or assembly systems, or in accordance with installation procedures. It can be desirable for the membrane to be considerably larger than a leak-alarm target so as to maximize the area covered by each leak-alarm circuit. In some embodiments, a membrane and the resulting membrane assembly can have an area of at least 0.25 sqm (square meters), at least 0.5 sqm, at least 0.75 sqm, at least 1.0 sqm, at least 1.5 sqm, at least 2 sqm, or larger. The membranes and membrane assemblies illustrated herein show an aspect ratio that is approximately square, but this is not of importance and the membrane assemblies can have any suitable aspect ratio.

According to exemplary embodiments, fabrication of a membrane assembly 210 can include the installation of a capillary pathway 213 which covers, i.e., is capable of transporting a liquid from, a substantial part of the area of the membrane. A "capillary pathway" is a material suitable for transport of water along a pathway by capillary action. Such a material often includes fibers, such as plant-based fibers e.g., cellulose, polymer-based fibers e.g., polyester, glass fibers e.g., in a woven fabric or as bundles of glass fibers or as scattered broken, e.g., chopped, glass fibers, or carbon fibers, or any combination of different types of fibers. In some non-limiting examples, the fibers can be very small, i.e., having diameters in the range of several or tens of microns. While the term "pathway" may appear to imply that a pathway for water transport to a leak-alarm target may be a direct path, that is not necessarily the case. The transport of water through the capillary pathway may include progression in random directions or omnidirectional progression. In some embodiments, the capillary pathway 213 can include fibers arranged so as to form direct pathways but this is not necessary for the capillary transport to be effective. The key in deploying the capillary pathway is to ensure a substantially continuous pathway for the capillary transport regardless of either the direct nature of the transport or the fact that the water may be 'spread' in all directions throughout the capillary pathway material before reaching the leak-alarm target.

Fabrication of a membrane assembly 210 includes the installation of a leak-alarm circuit 250 as illustrated in FIG. 1A.

Installation of the capillary pathway 213 is in conduits 246. Conduits 246 are formed in the membrane 217 and are generally disposed to be parallel to one or both major surfaces of the membrane 217. Conduits can be formed by any ordinary manufacturing technique, such as—and not exhaustively—chipping, pressing, die-cutting, molding and 3D printing the membrane 217. Aggregately, the conduits 246 lead, either directly or indirectly, from many areas of the membrane 217 to the leak-alarm target (not shown in FIG. 1A) which is a component of the leak-alarm circuit 250. Installation of the leak-alarm circuit 250 is within an equipment space 247 that is in fluid communication with at least one conduit 246. As shown in the non-limiting example of FIG. 1A, the equipment space 247 can be in fluid communication with more than one conduit 246, or even with all of the conduits of a single membrane assembly 210. The equipment space 247 is shown in FIG. 1A as being at or near the geographic center of the membrane 217, but in other examples the equipment space 247 can be anywhere on the membrane where capillary pathway 213 in conduits 246 can transport a water-containing liquid, and its positioning is not limited to examples shown in the figures. Conduits and equipment spaces can be formed by any ordinary manufacturing technique, such as chipping, pressing, cutting, molding and 3D printing the membrane 217.

Installation of the leak-alarm circuit 250 in the equipment space 247 can be accomplished using any attachment option such as an adhesive or a mechanical fastener, or even by designing the equipment space 247 small enough to 'squeeze' the leak-alarm circuit 250 to keep it in place.

The membrane assembly 210 of FIG. 1A is shown in a bottom view, i.e., all of the conduits 246 and the equipment space 247 are open to the major surface that is the bottom surface of the membrane assembly 210 when installed. This is because a primary purpose of the membrane assembly 210 is to detect water or water-containing liquids below, i.e., beneath the sheet that is meant to seal the substrate against water. In some embodiments, the conduits 246 and/or the equipment space 247 can be cutouts in the membrane 217, meaning that they are open not only to the bottom surface, i.e., toward the substrate, but also to the top surface. In such embodiments, the equipment space 247 (and even the conduits 246) can be covered with a strong film or thin plate of material for protection against damage when being stepped on or having heavy objects placed upon it. In some embodiments, the conduits 246 and/or the equipment space 247 can be depressions in the waterproofing sheet 217. In such embodiments, the conduits 246 are grooves or channels open only to the bottom surface (i.e., the surface that is intended to be the bottom surface when installed), and the equipment space 247 is an equipment recess. Grooves and recesses can reduce the local thickness of the waterproofing sheet 217 by anywhere from 10% to 90%, inclusive, and preferably between 20% and 80% or 30% and 70%. The skilled artisan will understand that for embodiments in which the conduits 246 and equipment space 247 are cutouts as defined above, a 'top view' corresponding to the 'bottom view' of FIG. 1A can be similar to the bottom view, i.e., showing the same conduits 246 and equipment space 247 from 'above'. For embodiments in which the conduits 246 and equipment space 247 are formed as depressions in the waterproofing sheet 217 as defined above, a 'top view' would most likely show nothing.

FIG. 1C shows a membrane assembly 210 in a rolled-up format with optional roll-belts 215. The membrane assembly 210 can be stored in this format, and/or provided in this format for ease of installation.

FIG. 2 shows another non-limiting example of a membrane assembly 210 with a different pattern of conduits 246 than in FIG. 1A. Design of the conduits, including the number of grooves, their pattern and the extent of their dispersion, can depend on a number of factors taken into account in the design, for example (and not exhaustively): how much coverage of the area of the membrane assembly is desired, the efficacy of the capillary pathway which can differ based on material selection, size/thickness and method of installing in the conduits, the expected size and nature of leaks, the relative importance of more immediate leak detection, and cost. The membrane assembly 210 of FIG. 2 also differs from that of FIG. 1A in that the 'lattice' of grooves would obviously not be practical for use in a 'cutout' embodiment.

It can be desirable to have a capillary pathway 213 cover a large proportion of the area of the membrane 217. In embodiments, the aggregate footprint of the capillary pathway 213 can cover at least 30% of the area of the membrane 217; in other embodiments, the aggregate footprint can be at least 50%, at least 70%, or at least 90% of the area.

Figure 3B:
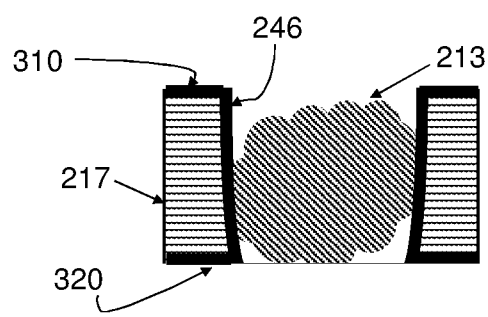
Figure 3C:
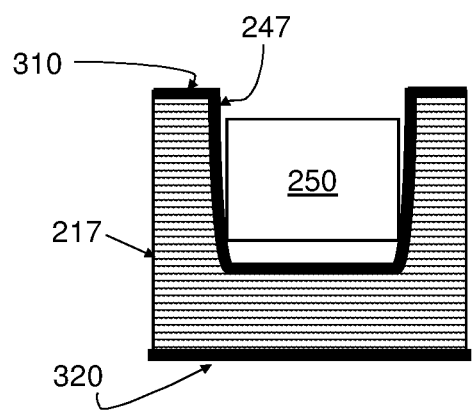
FIGS. 3C and 3D are schematic cross-sectional views of equipment spaces that are, respectively, an equipment recess and a cutout in the waterproofing sheet, according to embodiments of the present invention.
Figure 3D:
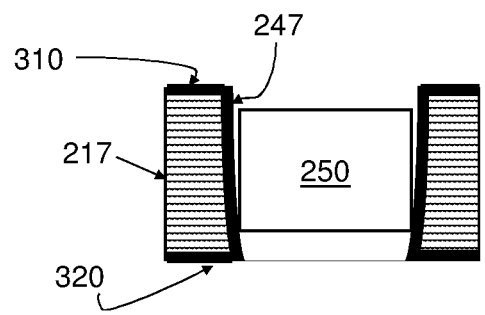

FIGS. 3A and 3B show details of typical conduits 246 with capillary pathway material 213. FIG. 3A shows a cross-section of a conduit 246 as a depressed groove, and FIG. 3B shows an analogous conduit 246 as a cutout. The membrane 217 includes first and second major surfaces 310, 320, respectively the bottom and top surfaces, i.e., the membrane 217 is 'upside down' in relation to the intended position when the membrane assembly 210 is operative and the membrane 217 is laid out on a substrate surface. FIGS. 3C and 3D are analogous figures showing an equipment space 247 with a leak-alarm circuit 250 installed within, for 'depression' and 'cutout' embodiments, respectively.

Figure 4:
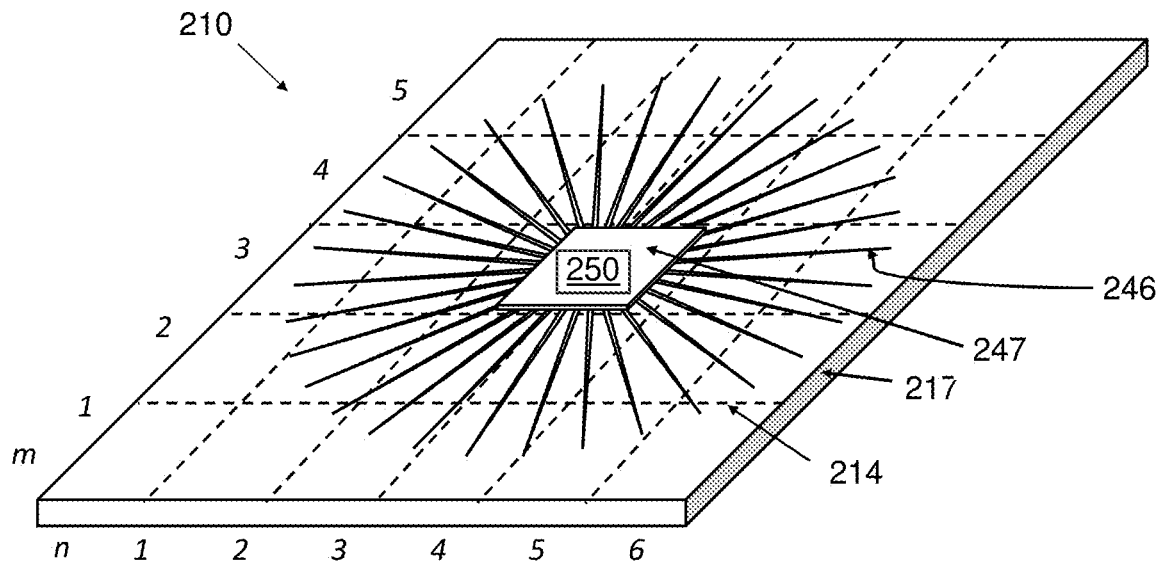
FIG. 4 is a perspective-view schematic drawing of a membrane assembly with respective capillary pathway provided in conduits provided in a waterproofing sheet, with an equal-area distribution grid superimposed thereupon, according to embodiments of the present invention.

In embodiments, it can be desirable to ensure continuity of a capillary transport pathway to a leak-alarm target throughout the plenum of a membrane assembly. In other words, it may be desirable—regardless of whether the capillary pathway has a high aggregate footprint relative to the area of the plenum—to ensure a wide distribution of capillary pathway material throughout the plenum. Referring now to FIG. 4, a membrane 217 with a capillary pathway 213 is shown schematically, according to a non-limiting example. Superimposed on the figure is a grid of m×n equal-area subdivisions of the area of the plenum. In the illustrative example of FIG. 4, m equals 5, n equals 6, and m×n equals 30. A careful examination of FIG. 4 reveals that 28 of the 30 equal-area subdivisions of the membrane area have at least some of the capillary pathway 213 within their respective borders—and since there are no discontinuities in the capillary pathway 213, there is a continuous capillary pathway from at least a portion of each one of 28 out of 30 equal-area subdivisions of the plenum area to a water-leak target within the footprint of the water-leak alarm 250. A grid of any resolution can be applied for assessing the distribution of the capillary pathway 213. In some embodiments, m×n can be equal to at least 30, at least 50, or at least 100. The proportion of equal-area subdivisions from which there is a continuous capillary pathway to the leak-alarm target 251 can be at least 50% of the total equal-area subdivisions of the membrane area, at least 70% of the total equal-area subdivisions of the membrane area, or at least 90% of the total equal-area subdivisions of the membrane area as illustrated in FIG. 4.

Figure 5:
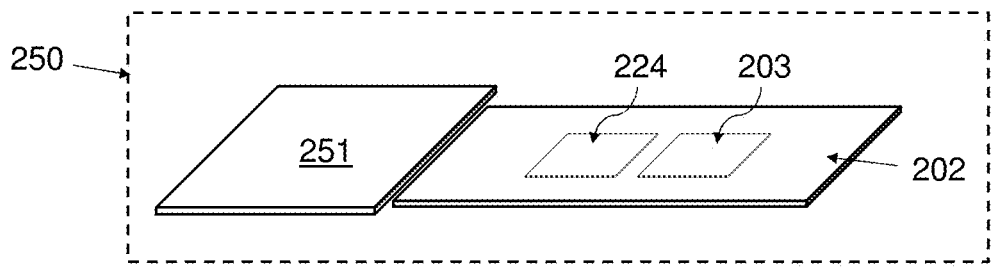
FIGS. 5 and 6 are block diagrams of leak-alarm circuits, according to according to embodiments of the present invention.

FIG. 5 illustrates, schematically, key components of a leak-alarm circuit 250. Leak-alarm target 251 comprises the water-activated trigger for activating the leak-alarm circuit 250 in the presence of a water-containing liquid. The leak-alarm circuit 250 also comprises electronic circuit 202, a transmitter 224 and antenna 203. According to embodiments, when leak-alarm target 251 is activated by the presence of water, transmitter 224 transmits a signal via antenna 203. A leak-alarm target 251 can have a very small footprint relative to the area of a capillary pathway 213 or to the total area of the membrane 217. In examples, the area of membrane 217 can be at least 20 times larger than the footprint of the leak-alarm target 251 i.e., a footprint defined on the primary plane of the membrane 217. In some embodiments, the area of the membrane 217 can be at least 40 times larger than the footprint of the leak-alarm target 251. In some embodiments, the area of the membrane 217 can be at least 100 times larger than the footprint of the leak-alarm target 251.

A water-leak alarm can comprise any water-activated circuit configured to be triggered by the presence of water and thereupon transmit a signal.

Figure 6:
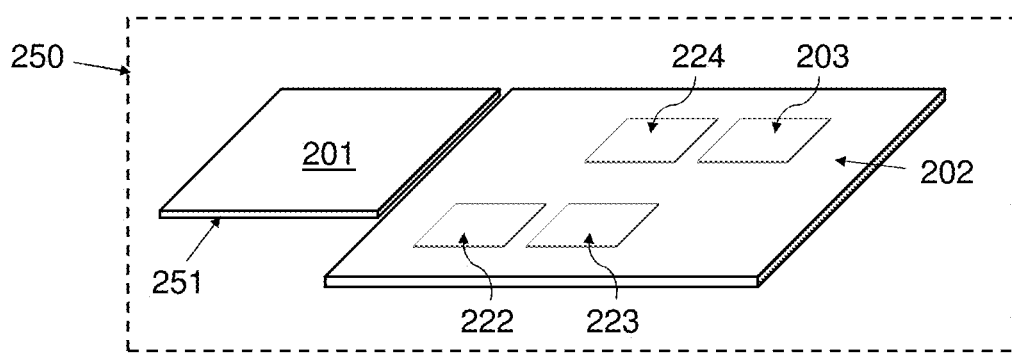

In an example, illustrated schematically in FIG. 6, leak-alarm target 251 comprises a water-activated battery 201. In this example, the electronic circuit 202 can additionally include a capacitor 222 for storing energy from the water-activated battery in case the voltage and/or power generated by the water is/are designed to be too low to directly power the transmitter 224. Energy can be stored by the capacitor 222 until released, for example, using a voltage-controlled solenoid switch 223. In some embodiments, the electronic circuit 202 comprises a charge pump, DC to DC converter that uses capacitors such as capacitor 222 for energetic charge storage to raise voltage.

A water-activated battery, as is known in the art, is built of two electrodes typically made from thin metal foils or meshes attached and kept dry until a water-containing liquid is introduced between the electrodes so as to generate an electric current. Examples of materials that can be used as anodes are zinc, aluminum, magnesium, and alloys thereof. Examples of suitable cathode materials include copper or copper alloys, or nickel. In some cases, an electrode can comprise a metallic substrate coated with are galvanized (zinc-coated) steel or tin coated steel. If desired, higher cell voltages may be obtained using manganese dioxide/carbon cathodes. In some embodiments, as shown schematically in cross-sectional side view in FIG. 7A, the capillary pathway 213 can serve as a separator between two electrodes 240. An electrical connection 242 of a material selected to avoid a galvanic reaction over time connects the electrodes 240 through the capillary pathway 213. The capillary pathway 213 insulates the electrodes 240 from each other over time, until water transported by the capillary pathway 213 reaches the electrodes 240, e.g., from a leak in the membrane assembly 210. In other embodiments, as shown in Fig. B, both electrodes 240 can be installed on the same side of the capillary pathway 213, e.g., for greater ease of producing the membrane assembly 210. As shown in the example of FIG. 7B, more than one pair of electrodes 240 can be deployed, e.g., to increase voltage from the battery(ies). FIG. 7B shows two pairs of electrodes 240 wired in series by series connector 243; in other examples, electrodes can be combined in any size and number to achieve a desired mix of current density and voltage.

Figure 7A:
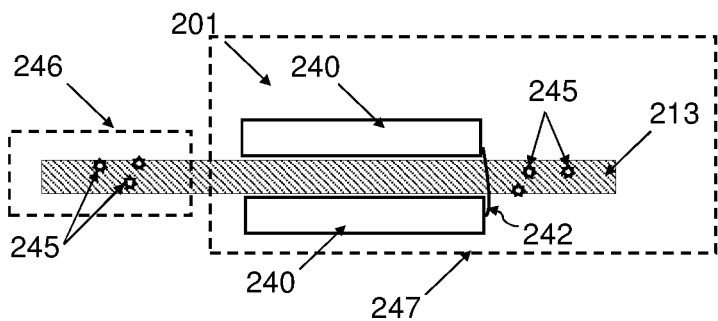
FIGS. 7A and 7B are partial schematic cross-sectional side views of components of leak-alarm circuits in a membrane assembly, according to embodiments of the present invention.
Figure 7B:
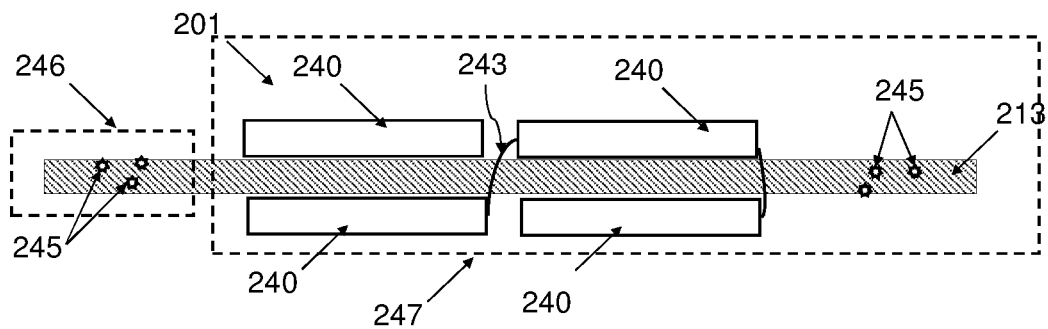
Figure 8:
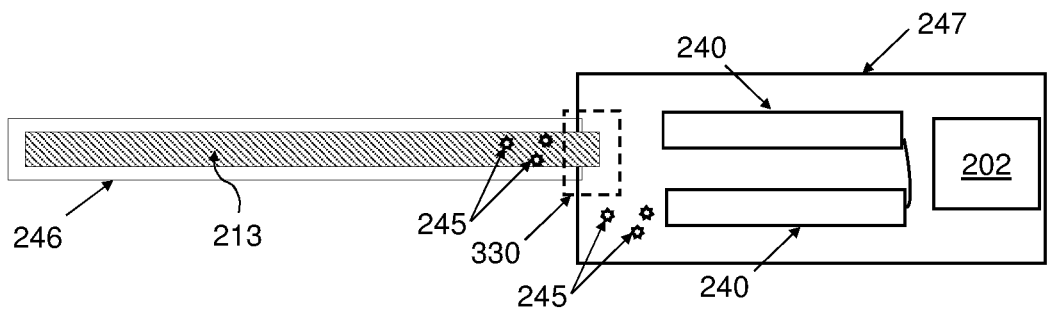
FIG. 8 is a partial schematic top plan view of components of a leak-alarm circuit in a membrane assembly, according to embodiments of the present invention.

In any of the examples of FIGS. 7A-7B and 8, the footprint of the water-activated batter 201, i.e., of electrodes 240, can be a tiny fraction of the footprint of the capillary pathway 213. In some embodiments, as illustrated in FIG. 8 but also relevant to the electrode configurations of FIGS. 7A-7B the capillary pathway 213 reaches the inlet 330 of the equipment space 247 but does not touch the electrodes; instead the pooling of water transported to the equipment space 247 by the capillary pathway 213 pools in the equipment space 247 until the water reaches the electrodes. In such a case, a different material can be used for an electrode separator. In another example (not illustrated), the separator of the electrodes 240 is a different fiber-containing, capillary transport-facilitating material than capillary pathway 213.

In some embodiments, a water-activated battery 201 requires a solution of a salt in the water-containing liquid for the liquid to act as an electrolyte. To this end, salts in the form of inorganic crystalline hygroscopic molecules, or such as neutral alkaline, or acidic materials, $NH_4Cl$, sodium carbonate, citric acid, NaCl, or $ZnCl_2$, or any other type of salt, can be made available within the capillary material 213. As shown in FIGS. 7A-7B and 8, a salt 245 can be distributed within the open structure of the capillary pathway 213 and/or within equipment space 247. The salt 245 is preferably not distributed in the part of the capillary pathway 213 that is within the footprint of one or both electrodes 240 so as to prevent inadvertent activation during the storage life of the membrane assembly 210 and to prevent corrosion of the electrodes while the water activated battery is inactive.

Figure 9:
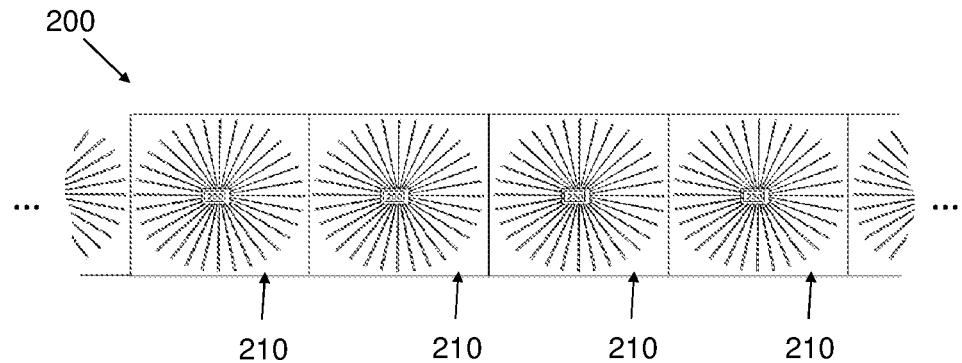
FIG. 9 shows a super-assembly of water-impermeable membrane assemblies as a continuous roll of membrane assemblies, according to embodiments of the present invention.

We now refer to FIG. 9. According to embodiments, a super-assembly 200 comprises a plurality of membrane assemblies 210 that are assembled in accordance with any of the embodiments disclosed herein. The individual membrane assemblies 210 can be fabricated in a continuous strip of membrane assemblies 210. The dividing lines between individual membrane assemblies 210 in FIG. 9 represent the extent of each membrane assembly and are shown for illustration purposes only. The super-assembly 200 can be rolled up for transport and use (as was illustrated in FIG. 1C) for ease of storage, transport and/or installation.

Figure 10A:
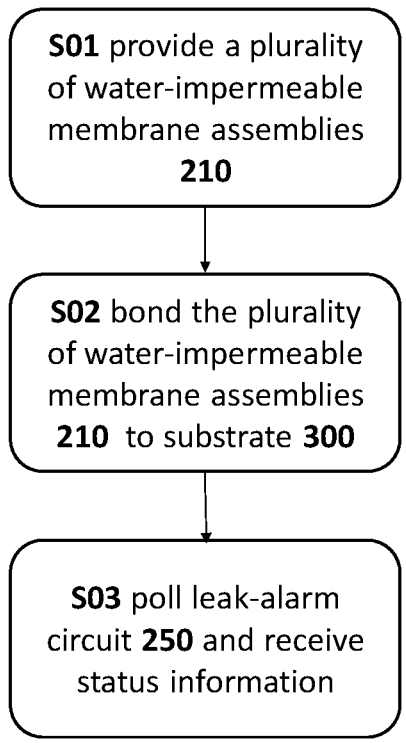
FIGS. 10A and 10B show flowcharts of methods for using water-impermeable membrane assemblies, according to embodiments of the present invention.

Referring now to FIG. 10A, a flowchart is shown of a method for sealing a substrate with a plurality of leak-detecting membrane assemblies. The method comprises:

Step S01 provide a plurality of water-impermeable membrane assemblies 210. The membrane assemblies 210 can be provided as a super-assembly 200.

Step S02 bonding a plurality of water-impermeable membrane assemblies 210 to substrate. This step can also be performed using a a super-assembly 200.

Step S03 polling the leak-alarm circuit 250 and receiving status information.

In some embodiments, not all of the steps of the method are performed.

Figure 10B:
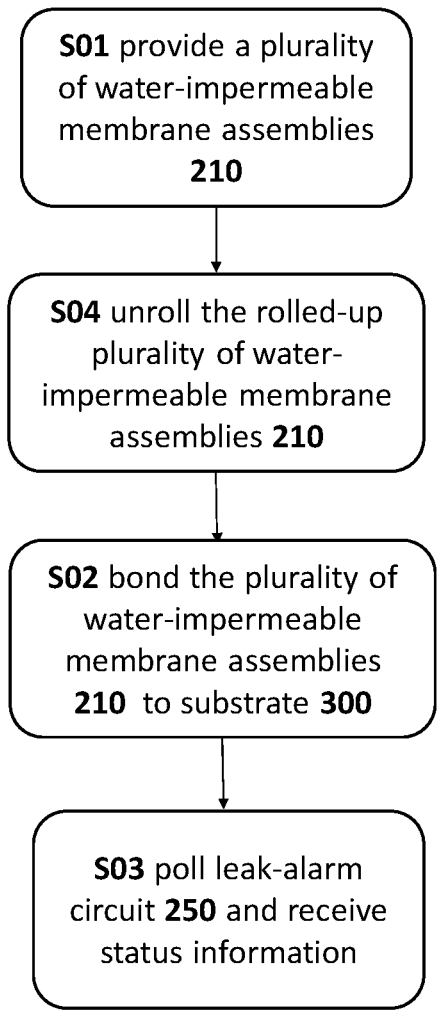

Referring now to FIG. 10B, a flowchart is shown of another method for sealing a substrate with a plurality of leak-detecting membrane assemblies. The method is especially relevant to membrane assemblies 210 (or super-assemblies 200) provided and/or stored in a rolled-up format. The method comprises:

Step S01 provide a plurality of water-impermeable membrane assemblies 210. The membrane assemblies 210 can be provided as a super-assembly 200.

Step S04 unrolling the plurality of water-impermeable membrane assemblies 210 as a preparation for bonding in Step S02.

Step S02 bonding a plurality of water-impermeable membrane assemblies 210 to substrate. This step can also be performed using a a super-assembly 200.

Step S03 polling the leak-alarm circuit 250 and receiving status information.

In some embodiments, not all of the steps of the method are performed.

Additional Discussion

The present invention relates to a novel system for effective monitoring of breach in structural sealing that may cause leaks. It will send alerts about the fault, its severity, the time it occurred and its exact location.

Providing early detection and accurate location of the fault will prevent the leakage damages by allowing the rapid and precise local repair of the sealing and stop the leakage before the humidity penetrates the building and causes damages. This saves money, time and ongoing inconvenience involved when leakage penetrates the building and it takes time and money to find the defected area and usually the whole sealing has to be replaced.

Using this new invention, allows the fast fix of the fault in a fraction of time and cost of repairing the conventional sealing, as it enables to pin point in "no time" the failure and replace only the defected small section in the sealing membrane, which ends up with only a small portion of the cost of replacing an entire roof section.

The new system which is the subject of this invention can be applied to existing building while renewing the conventional sealing and will be used to seal roofs walls etc. in new buildings and structures.

One way to apply this new technology is by integrating it into bitumen sealing sheets. Each segment (membrane) of the sheet (super-assembly) includes an autonomous detection-transmission monitoring unit (ADTMU), which detects whenever water penetrates the segment and transmits the information about the fault and its location to the owner or the maintenance company. The ADTMUs are not active until a fault is created and water penetrates its segment. As water seeps in, it "wakes up" and begins sending warning signal informing about the breach and its location.

Figure 11:
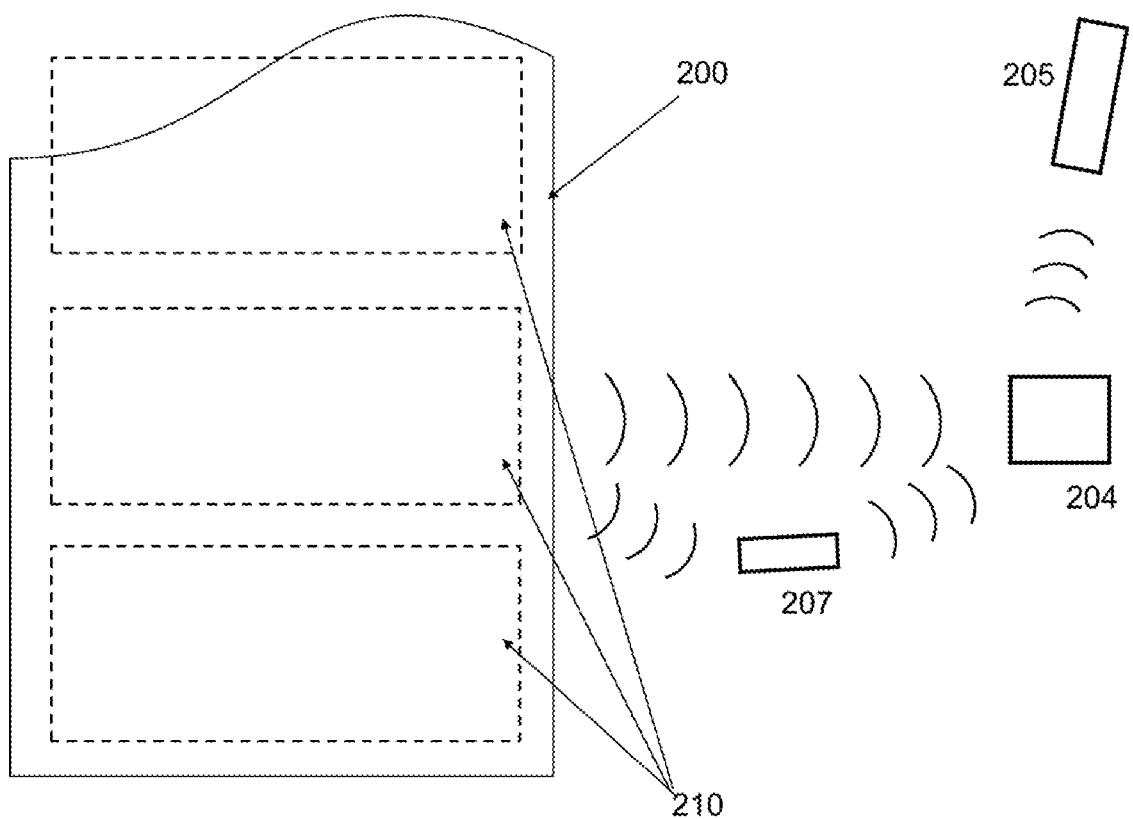
FIGS. 11 and 12 are block diagrams of autonomous detection transmission monitoring units according to embodiments of the present invention.

FIG. 11 is a block diagram of the system. It includes a smart sealing sheet 200 divided into several segments 210. Each segment includes an ADTMU.

A Control Unit 204, is located within the transmission range of all the ADTMUs. When humidity reaches one of the segments, its ADTMU is activated and sends a warning signal to the Control Unit 204. The Control Unit activates an alarm or broadcasts the alarm on the cellular, LAN or web network to a monitoring system, 205. This monitoring system can be a smartphone, computer or any other device which will cause an alarm.

For large roof areas or roofs covered with vegetation tiles or earth, which may limit the range of transmission of the ADTMU 210 to the Control Unit 204 a transducer 207 can be used, for passing on the signal received from the ADTMU 210 and retransmit it to the Control Unit 204.

Figure 12:
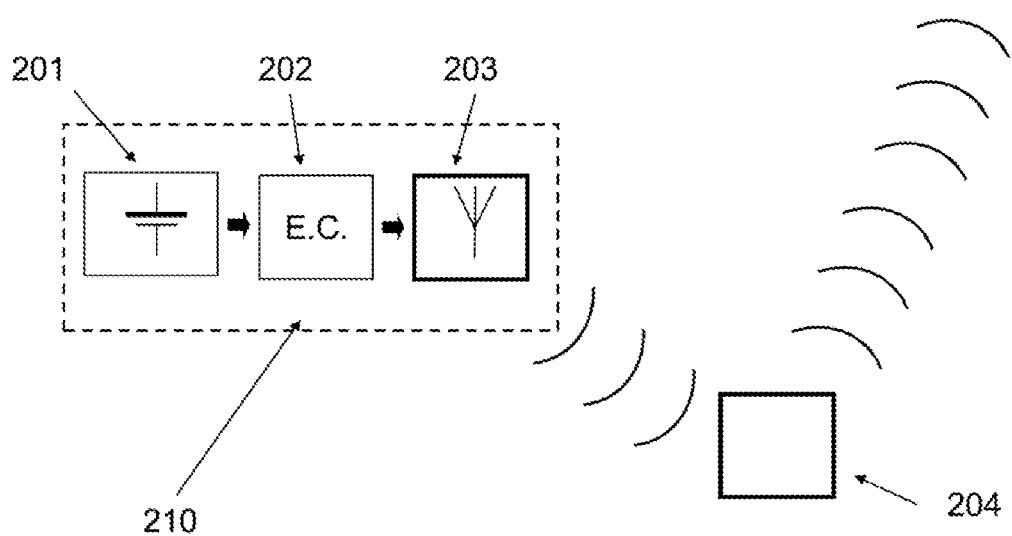

FIG. 12 is a block diagram of an exemplary ADTMU. The ADTMU 210 includes a water activated battery 201 which creates electricity only in the presence of water; therefore it will be activated only if following a fault, water reaches the battery 201. As soon as the battery is activated it begins to supply power to the electric circuit ("EC") 202, causing it to transmit a signal with an alert message. The EC uses the antenna 203 for allowing the transmitted signal to reach the control unit 204.

As long as there is no fault in the sealing, the battery 201 is not active and does not produce any power, and the whole system is in its "dormant" state. Once following of a fault water enters the sealing, the battery 201, is activated beginning to emit electric current, causing the electric circuit EC 202, to broadcast a signal to the control unit 204 ("CU"), informing it about the fault its location and severity, which in turn activates the alarm and broadcasts it on the cellular, LAN, web network etc.

The electric circuit 202 may be sealed in a water-tight package, isolated from the separator and all its surroundings, so that electric circuit 202 stays dry when the separator gets damp.

An antenna 203 can be built of a thin conductor wound in several coils along the margin of the section, also insulated and waterproofed from its surroundings. The antenna's length and structure can be determined and adjusted according to the required range and frequency of the transmission.

Figure 13:
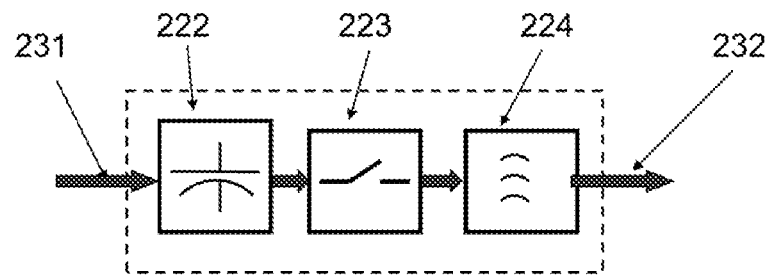
FIG. 13 is a block diagram showing an example of an electrical circuit according to embodiments of the present invention.

FIG. 13 is an exemplary block diagram of the electric circuit EC. An input point 231 from the battery to the electric circuit is shown. The input is connected to a capacitor 222 which accumulates and stores the electric energy and is connected to a voltage-controlled solenoid switch 223. Once the accumulated electricity reaches the capacitor's upper threshold with enough energy to power the transmission, the switch is turned on and the electric circuit is closed, connecting the capacitor to the transmitter 224. The transmitter begins at this stage to broadcast the alert signal through its antenna. As time passes the transmitter consumes electricity and the charge in the capacitor is reduced until it reaches its lower threshold. The switch then turns off, the circuit is broken, and the capacitor is disconnected from the transmitter, terminating the broadcast. The capacitor then begins to recharge, accumulating energy from the battery. This process is repeated, as long as the battery stays damp and for the span of the battery life.

Figure 14:
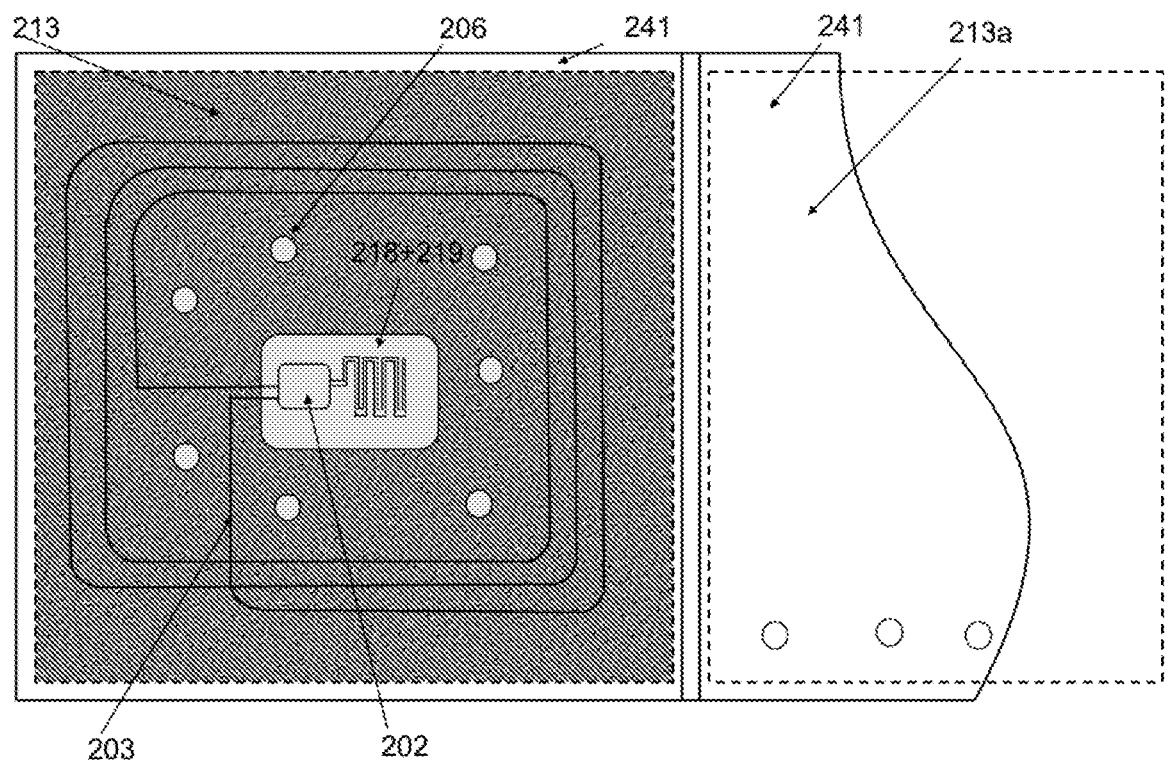
FIG. 14 is a top of view of an autonomous detection transmission monitoring unit in a membrane segment according to embodiments of the present invention.

FIG. 14 is a top view of an ADTMU in a membrane segment, where all the components including both the anode and cathode are located—on the same side of the separator. In order to improve the production process, an additional embodiment is shown in which all the components of the ADTMU are applied on the same side of the separator including both electrodes—the anode and cathode of the Water Activated Battery.

Instead of using two metal foils on both side of the separator, a pair of wires 218,219, are applied to the upper side of the separator. These two wires are made of two different metals, and are laid close and parallel to each other, on the same side of the separator 213, e.g. in a sawtooth pattern, one is the cathode and the other anode.

All the separator area is impregnated with salt except the area around the electrodes, so that no impregnated salt gets in touch with the electrodes 218,219 as long as it remains dry. As soon as water penetrates the sealing, it reaches the separator, the salt that turns into an electrolytic solution, spreads into the area beneath the wires—the electrodes 218,219, activating the battery. Than the battery activates the electronic unit 202 and it starts to transmit through the antenna 203 that surrounds the inner part of the segment.

The fact that all the components, including both electrodes, are applied to one same side of the separator 213 simplifies the production and improves its reliability.

An advanced electric circuit with improved features is described. It has the following advantages:
- Nondestructive wireless test of the Smart Sealing Sheet for checking perfection of the system after installation and allowing seasonal tests according to a maintenance plan.
- Uniquely identifying the location of the faulty section, so that the information broadcasted by the control unit includes the exact location of the fault, without needing any scanning after getting the alarm.
- Prevention of false alarms due to electronic interference in the area or receiving signals from other roofs.
- Preventing lightning strikes.
- Using a lower cost battery producing less voltage, embedding a more efficient circuit consuming less power.
- Using frequencies which penetrate the coverage of the bitumen sealing.

Figure 15:
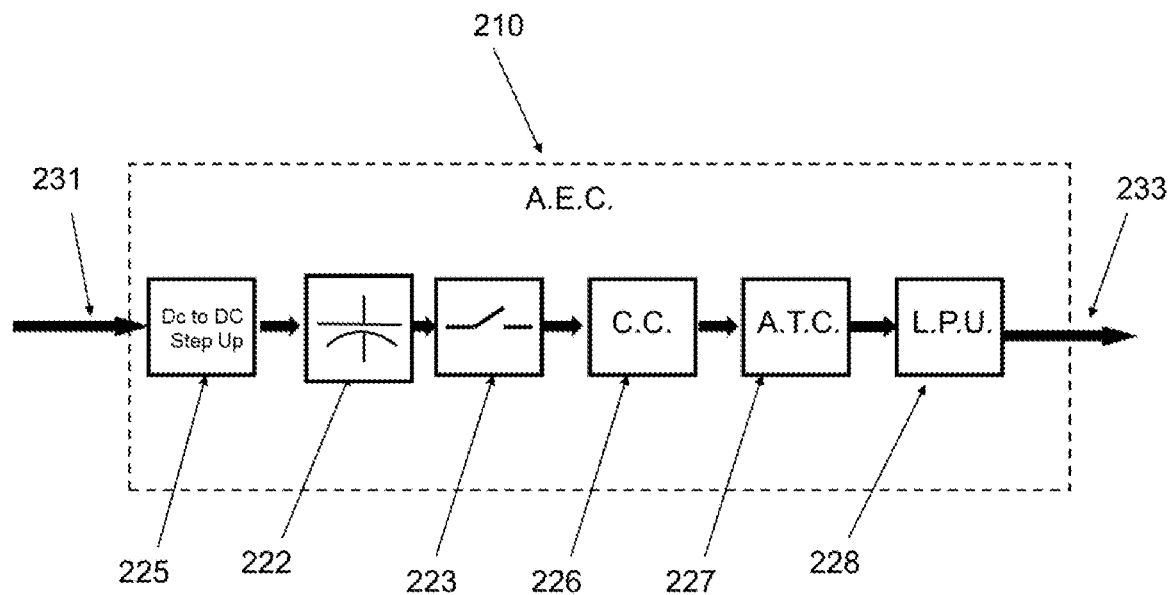
FIG. 15 is a block diagram showing an example of an electrical circuit according to embodiments of the present invention.

FIG. 15 is a sample block diagram of the advanced electric circuit.
- The input from the battery 231 is connected to a DC to DC step-up Power Converter 225 which increases the charge received from the battery and allows the circuit to work with lower voltage battery. The Power Converter 225 is connected to the Electric Capacitor 222, which in turn is connected through a Voltage Powered Solenoid Switch 223 to the control circuit 226.

The control circuit 226, is connected through an Antenna Termination Resistor Cap 227 which in turn is connected through a Lightning Protection Circuit 228 to the antenna's combined output/input endpoint 233 as hereafter will be explained.

Figure 16:
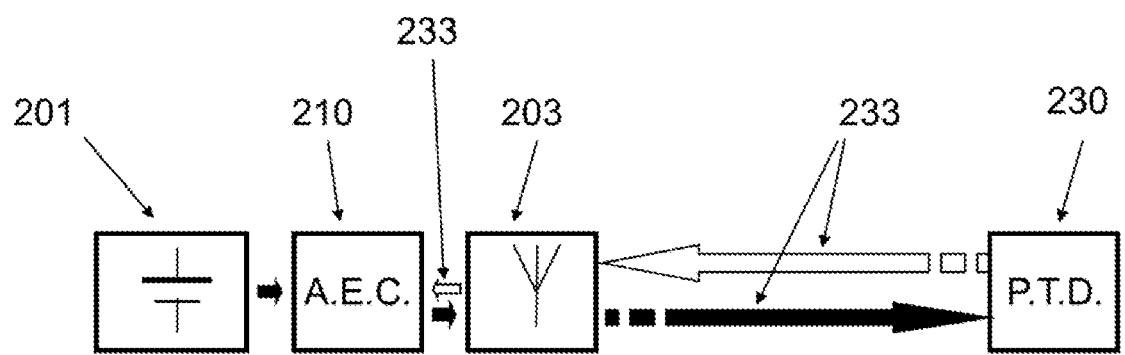
FIG. 16 is a block diagram of a membrane assembly being tested with a portable testing device according to embodiments of the present invention.

FIG. 16 is a block diagram of the Smart Sealing Sheet being tested with a Portable Testing Device for long term reliability. A Portable Testing Device P.T.D. 230 is used for checking the perfection of the system either after installation or to perform periodical test according to a maintenance plan to ensure its long-term reliability.

The test is aimed for both:
a Test the ability of the electronic system to alert.
b Test the "health" of the water activated battery.

A Portable Testing Device P.T.D. 230 is used as follows:
a To test the electronic system, the P.T.D 230 is equipped with a directional antenna and when testing, each section is pointed to, and is tested separately. It broadcasts a directional—low-divergence, signal to the antenna 203 through the antenna's combined output/ input endpoint 233. The antenna transfers the energy received from the Portable Testing Device to energize the Advanced Electric Circuit 210 to turn it on as it would happen by the battery when activated by humidity. The same antenna 203 is used for both, receiving the energy needed to activate the Advanced Electric Circuit 210, and afterwards to transmit the test signal back to the Portable Testing Device PDT 230.

b To test the "health" of the water activated battery without activating it. The P.T.D 230 is equipped, with an impedance measurement unit of AC frequency of 1000 Hz for example. An unwetted, non-activated battery of the type described above will have a characteristic high range of impedance, which will fall to lower values once the system is wetted activated. The exact impedance values will depend on the battery chemistry and construction but for a given system the values will be known. An impedance check will then confirm that the battery is in a non-activated "healthy" state, ready for being activated by wetness.

Figure 17:
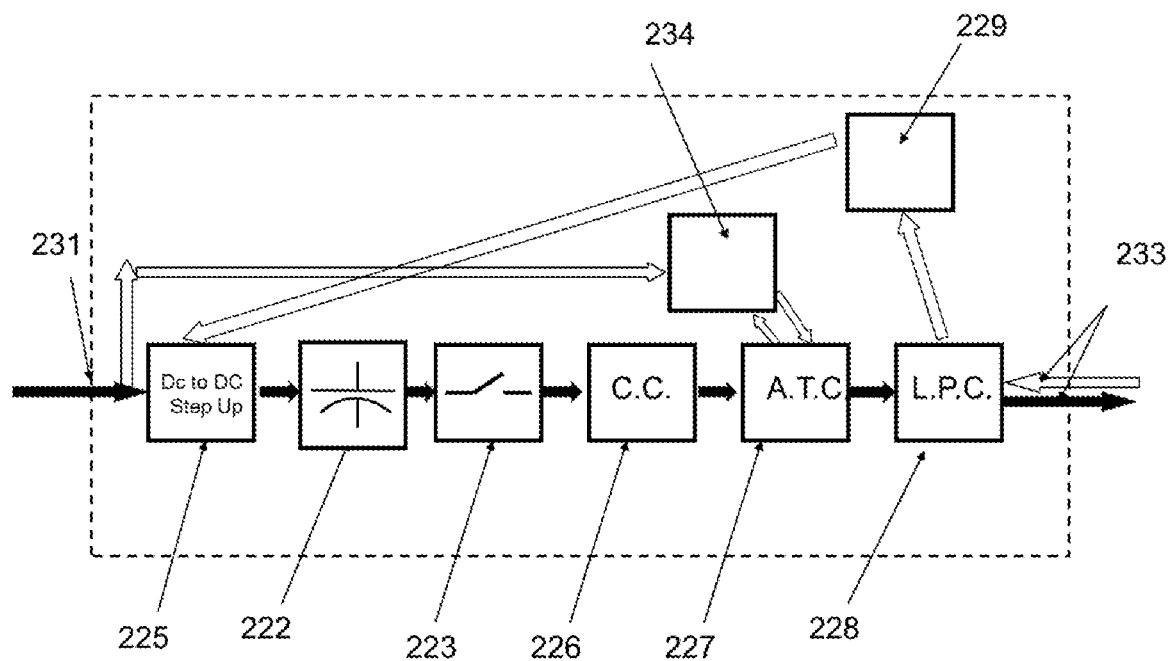
FIG. 17 is a block diagram showing an example of an electrical circuit according to embodiments of the present invention.

FIG. 17 is a block diagram of the electric circuit being tested. Energy from the Portable Testing Device PDT enters through the combined antenna input/output point 233 into the Electric Surge and Lightning Protection Unit LPU 228, and then into the Remote Charging Circuit 229, from there into the DC to DC Step-up Power Converter 225, as it would be using the battery. From there it continues as a regular fault indication triggered by dampness, to the Electric Capacitor 222 for charging the capacitor with energy. This simulates the process which in case of fault would be triggered by dampness. The output signal is now transmitted back to Portable Testing Device is received and analyzed by it.

It should be understood by any person skilled in the art, that when operating the self-test mode from the portable testing device on each section of the sheet, with a directed transmission using a directed antenna, only the section being tested will be affected and the energy will not reach adjacent sections. to achieve this, the portable testing device has a unidirectional antenna with the ability to adjust and fine tune initial transmission energy and amplitude. thus, each section is tested separately one by one.

It is obvious to any person skilled in the art, that the process of accepting the test signal and initiating the self-test, is separated in time from the process of emitting the return signal so that the two do not interfere with one another.

The self-test may include testing the battery for its state of readiness by an impedance measurement. This can be done wireless using a test circuit 234 implemented into the electric circuit being connected to the battery. The results of the impedance measurement will be transmitted to the Portable Testing Device—P.T.D. 230.

A Numeric Example for the Electric Circuit

A low voltage output from a battery for example with a working voltage of 0.7 V made using two single electrodes from copper Cu and zinc Zn foils and an electrolyte solution based on table salt NaCl. The Power Converter 225 charges the Capacitor 222, until its charge reaches the upper threshold of 1.9 volt. At this stage, the switch turns on, the circuit is closed, and the transmitter begins broadcasting, consuming electricity until the capacitor reaches its lower threshold of for example 0.9 volt.

Assuming that we have used a 40 µf capacitor, the transmitter consumed only 23 µJ allowing it to broadcast a 20 ms. transmission with a 1.6 mA current to over 30 meters and more, even when the antenna is covered by tiles or submerged in damp gardening soil 0.5-meter-thick with vegetation on it.

An alternative option for conveyance of water becoming an electrolytic solution from the leak point to the battery area might be simply via etched or marked out grooves in the sealing inner layers which encapsulate the ADTMU.

RFID Based System

The water activated battery embodiment can be combined with active RFID components with a transmission range of up to 100 meters.

By using the water/dampness activated power source and the DC to DC step-up power converter as the power supply to an active RFID device, this device operates at an ultrahigh frequency UHF band to achieve expanded range.

Several RFID devices can share one transmitting antenna as each device transmits a unique code.

Size/diameter of the transmitting antenna determines the range of detection.

The control unit consists of an RFID fixed reader that receives the signal detects it and transfers it on the cellular, LAN or web network to a monitoring system, or to the consumer's smartphone or computer 205.

According to embodiments, a sealing membrane sheet, comprises multiple segments in which each segment consists of a humidity detector approaching the size of the whole segment, and sealed into each segment is a water activated battery and a wireless transmitter.

Unless otherwise defined herein, words and phrases used herein are to be understood in accordance with their usual meaning in normal usage. In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a shelf" or "at least one shelf" may include a plurality of markings.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

The invention claimed is:

1. A water-impermeable membrane assembly for sealing a substrate, the membrane assembly comprising:
   a. a waterproofing sheet having two opposing major surfaces and comprising (i) an equipment space and (ii) a plurality of conduits having openings disposed in at least a first surface of said major surfaces;
   b. a leak-alarm circuit disposed at least partly within said equipment space, the leak alarm circuit having a leak-alarm target operative to trigger activation of the leak-alarm circuit when in contact with a water-containing liquid, the leak-alarm circuit comprising:

i. an electronic circuit comprising a transmitter, the electronic circuit being operative, when in an activated state triggered by said leak-alarm target, to transmit a signal; and
ii. a battery connected to the electronic circuit for powering transmission of said signal; and
c. a capillary pathway disposed within at least a portion of the conduits, said portion including at least one conduit in fluid communication with the equipment space and with respective openings disposed in at least said first surface, so as to provide a pathway for transport of a water-containing liquid by capillary action from said openings to said leak-alarm target.

2. The membrane assembly of claim 1, provided in a continuous strip of membrane assemblies.

3. The membrane assembly of claim 1, wherein at least some of the conduits comprise cutouts in the waterproofing sheet.

4. The membrane assembly of claim 3, additionally comprising a shielding material covering at least one cutout, the shielding material being disposed on or adjacent to at least one of said major surfaces and configured to provide protection for the contents of said at least one cutout.

5. The membrane assembly of claim 1, wherein at least some of the conduits comprise grooves open solely on one major surface of the waterproofing sheet.

6. The membrane assembly of claim 1, whereby, in an operative mode, with the waterproofing sheet laid out on the substrate, a water-containing liquid disposed between the substrate and the membrane assembly is drawn up through said capillary pathway.

7. The membrane assembly of any claim 1, wherein a portion of said capillary pathway is disposed at an inlet of said equipment space so as to provide a pathway for ingress of the water-containing liquid into said equipment space.

8. The membrane assembly of claim 1, wherein:
i. the leak-alarm target includes the battery, and
ii. the battery comprises two electrodes which in combination are electrochemically activatable by the presence of an aqueous liquid.

9. The membrane assembly of claim 1, wherein the capillary pathway comprises a plurality of fibers selected from the group consisting of at least one of plant-based fibers, polymer-based fibers, glass fibers and carbon fibers.

10. The membrane assembly of claim 1, wherein with a footprint area of the membrane virtually divided into 100 equal-area subdivisions, a continuous capillary pathway exists from at least 50 of said equal-area subdivisions to said leak-alarm target.

11. The membrane assembly of claim 1, wherein the leak-alarm circuit is configured to transmit information related to at least one of: its status, the identity of the membrane assembly and the location of the membrane assembly in response to being polled.

12. The membrane assembly of claim 1, wherein a ratio of a footprint area of said leak-alarm target to a footprint area of said membrane is less than 0.15.

13. The membrane assembly of claim 1, wherein the thickness of the membrane is reduced in depressions in the membrane by at least 10% and not more than 60%.

14. A method of sealing a substrate with a plurality of leak-detecting membrane assemblies, the method comprising:
a. providing a plurality of water-impermeable membrane assemblies, each membrane assembly comprising:
i. a waterproofing sheet having two opposing major surfaces and comprising (A) an equipment space and (B) a plurality of conduits having openings disposed in at least a first surface of said major surfaces;
ii. a leak-alarm circuit disposed at least partly within said equipment space, the leak alarm circuit having a leak-alarm target operative to trigger activation of the leak-alarm circuit when in contact with a water-containing liquid, the leak-alarm circuit comprising:
A. an electronic circuit comprising a transmitter, the electronic circuit being operative, when in an activated state triggered by said leak-alarm target, to transmit a signal; and
B. a battery connected to the electronic circuit for powering transmission of said signal; and
iii. a capillary pathway disposed within at least a portion of the conduits, said portion including at least one conduit in fluid communication with the equipment space and with respective ones of said openings disposed in at least said first surface, so as to provide a pathway for transport of a water-containing liquid by capillary action from said openings to said leak-alarm target, and
b. bonding, to the substrate, said plurality of water-impermeable membrane assemblies.

15. The method of claim 14, additionally comprising, after said bonding, polling said leak-alarm circuit and, in response to said polling, receiving information transmitted by said leak-alarm circuit, the information being related to a status of said leak-alarm circuit.

* * * * *